(12) United States Patent
Riedlinger et al.

(10) Patent No.: US 8,020,038 B2
(45) Date of Patent: Sep. 13, 2011

(54) SYSTEM AND METHOD FOR ADJUSTING OPERATING POINTS OF A PROCESSOR BASED ON DETECTED PROCESSOR ERRORS

(75) Inventors: Reid J. Riedlinger, Fort Collins, CO (US); Steven F. Liepe, Fort Collins, CO (US); Douglas John Cutter, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1059 days.

(21) Appl. No.: 11/529,145

(22) Filed: Sep. 28, 2006

(65) Prior Publication Data

US 2008/0155321 A1 Jun. 26, 2008

(51) Int. Cl.
*G06F 11/00* (2006.01)
(52) U.S. Cl. .............. 714/10; 714/17; 714/745
(58) Field of Classification Search ............ 714/745
See application file for complete search history.

(56) References Cited

U.S. PATENT DOCUMENTS

| | | | |
|---|---|---|---|
| 5,838,578 A | 11/1998 | Pippin | |
| 5,870,614 A | 2/1999 | Ang | |
| 5,873,053 A * | 2/1999 | Pricer et al. ............. | 702/130 |
| 6,047,248 A | 4/2000 | Georgiou et al. | |
| 6,131,174 A | 10/2000 | Fischer et al. | |
| 6,172,611 B1 | 1/2001 | Hussain et al. | |
| 6,192,479 B1 | 2/2001 | Ko | |
| 6,219,723 B1 | 4/2001 | Hetherington et al. | |
| 6,269,443 B1 * | 7/2001 | Poisner et al. ............. | 713/1 |
| 6,329,831 B1 | 12/2001 | Bui et al. | |
| 6,363,490 B1 | 3/2002 | Senyk | |
| 6,393,374 B1 * | 5/2002 | Rankin et al. ............. | 702/132 |
| 6,415,388 B1 * | 7/2002 | Browning et al. ......... | 713/322 |
| 6,433,568 B1 | 8/2002 | Whipple et al. | |
| 6,473,871 B1 * | 10/2002 | Coyle et al. ............... | 714/715 |
| 6,487,668 B2 | 11/2002 | Thomas et al. | |
| 6,510,400 B1 | 1/2003 | Moriyama | |
| 6,518,782 B1 | 2/2003 | Turner | |
| 6,615,366 B1 | 9/2003 | Grochowski et al. | |
| 6,636,910 B2 | 10/2003 | Kung et al. | |
| 6,804,793 B2 * | 10/2004 | Josephson et al. ........ | 713/501 |
| 6,823,516 B1 | 11/2004 | Cooper | |
| 6,857,092 B1 | 2/2005 | Fox | |
| 6,909,922 B2 * | 6/2005 | Tymchenko ............... | 700/21 |
| 6,947,865 B1 * | 9/2005 | Mimberg et al. .......... | 702/130 |
| 7,085,993 B2 * | 8/2006 | Goodnow et al. ......... | 714/798 |
| 7,447,919 B2 * | 11/2008 | Liepe et al. ............... | 713/300 |
| 7,480,838 B1 * | 1/2009 | Wilkerson et al. ........ | 714/700 |
| 2003/0074591 A1 * | 4/2003 | McClendon et al. ...... | 713/322 |
| 2004/0199821 A1 * | 10/2004 | Flautner et al. ........... | 714/30 |
| 2005/0043910 A1 * | 2/2005 | Knebel et al. ............. | 702/106 |
| 2005/0246613 A1 * | 11/2005 | Blaauw et al. ............ | 714/763 |
| 2007/0174746 A1 * | 7/2007 | Haefliger et al. .......... | 714/721 |
| 2008/0046766 A1 * | 2/2008 | Chieu et al. ............... | 713/300 |
| 2009/0265581 A1 * | 10/2009 | von Collani et al. ...... | 714/34 |

* cited by examiner

Primary Examiner — Gabriel Chu

(57) ABSTRACT

A processor comprises a processor core and a controller. The processor core has an execution unit configured to execute instructions and to attempt to perform at least one operation in executing one of the instructions. The processor core is configured to detect a processor error associated with the at least one operation. The controller is configured to change an operating point of the processor core in response to a detection of the processor error such that the processor core operates at a new operating point, and the processor core is configured to retry the at least one operation while the processor core is operating at the new operating point.

15 Claims, 3 Drawing Sheets

SYSTEM AND METHOD FOR ADJUSTING OPERATING POINTS OF A PROCESSOR BASED ON DETECTED PROCESSOR ERRORS

BACKGROUND

Computer systems have one or more processors that manipulate and control the flow of data by executing instructions. To provide more powerful computer systems, processor designers strive to continually increase the operating speed or frequency of the processor. As processor speed increases, the power consumed by the processor tends to increase as well resulting in higher temperatures within the processor. Moreover, increases in processor frequency and temperature can result in unreliable performance and cause errors to occur within the processor. Various techniques have been developed in an effort to optimally control processor temperature and frequency.

For example, some processors include an on-chip controller that adjusts the power supplied to the processor and the operating frequency of the processor based on a measured temperature of the processor. Thus, the processor can run at a higher operating frequency and, if the processor begins to overheat, the controller can reduce the processor's power and frequency until the processor's temperature falls back into a normal operating range. Therefore, the processor can achieve better performance during periods when its temperature is relatively low yet avoid at least some heat-related errors by throttling back power and frequency when the temperature increases above a specified threshold.

Moreover, the operating temperature and frequency of a processor can change while the processor is running. To ensure robustness, extensive testing of the processor is required. For example, before a processor manufacturer releases a product to the public, the manufacturer usually tests the processor at many different operating points to ensure that it operates correctly at the different operating points. As used herein, an "operating point" of a processor is defined by an operating frequency and temperature. Thus, if a processor is tested multiple times at the same operating point, then the processor's operating frequency and temperature are the same for each of the tests. However, if a processor is tested at different operating points for each of a set of tests, then the processor has a different operating temperature or frequency for each of the tests.

Based on the manufacturer's testing, the manufacturer typically configures a processor to operate within a certain range of operating points, referred to herein as the processor's "operating range." The processor's on-chip controller, as described above, can be used in an effort to ensure that the processor operates only within its allowed operating range. However, despite the extensive testing performed on current processors, processor errors still occur even at operating points within the operating range specified by the manufacturer. Further, as a processor ages, the quality of hardware components typically degrades, and errors can become more frequent within the processor particularly at operating points close to the upper limits of its operating range.

Moreover, better techniques for reducing and handling processor errors are generally desirable.

SUMMARY OF THE DISCLOSURE

Generally, embodiments of the present disclosure provide systems and methods for adjusting operating points of a processor based on detected processor errors.

A processor in accordance with one embodiment of the present disclosure comprises a processor core and a controller. The processor core has an execution unit configured to execute instructions and to attempt to perform at least one operation in executing one of the instructions. The processor core is configured to detect a processor error associated with the at least one operation. The controller is configured to change an operating point of the processor core in response to a detection of the processor error such that the processor core operates at a new operating point, and the processor core is configured to retry the at least one operation while the processor core is operating at the new operating point.

A method in accordance with one embodiment of the present disclosure comprises: executing instructions via a processor core, the executing comprising attempting to perform at least one operation while the processor core is operating at a first operating point; detecting a processor error resulting from the attempting to perform the at least one operation; controlling a clock signal and a power signal provided to the processor core such that the processor core is transitioned to a second operating point in response to the detecting; and causing the processor core to retry the at least one operation while the processor core is operating at the second operating point.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for adjusting operating points of a processor based on detected processor errors. A system in accordance with one embodiment of the present disclosure comprises a processor and an on-chip controller for controlling the operating temperature and frequency of the processor. The controller is "on-chip" in the sense that it is packaged on the same integrated circuit (IC) chip as the processor. Thus, the processor and the on-chip controller are integrated on a common substrate within the same package. However, in other embodiments, the controller may be off-chip and, therefore, outside of the processor package.

During operation, the controller adjusts a power signal and a clock signal provided to the processor. In this regard, the controller determines the operating temperature of the processor based on a temperature sensing device within the processor package and provides control signals to a power source and a clock that are both internal to the computer system in which the processor resides. Based on the control signals, the power source and the clock respectively adjust the power and clock signals provided to the processor such that the operating temperature and frequency of the processor remain within a desired range.

If an operation causes a processor error to occur, the controller adjusts the power and/or clock signal provided to the processor to change the processor's operating point. For example, the voltage of the power signal provided to the processor may be changed, or the frequency of the clock signal may be changed. The operation that caused the processor error is then retried while the processor is at the new operating point.

If desired, the operating range of the processor can also be adjusted such that, in the future, the processor is prevented from reaching the operating point at which the processor error occurred. Thus, future processor errors may be prevented.

Further, data defining the updated or new operating range may be stored in non-volatile memory and used to establish the thresholds for the operating limits of the processor at system boot for future power cycles. Thus, the processor may be permanently prevented from reaching the operating point at which the processor error occurred. Such a feature can help to dynamically compensate for performance degradation due to aging. In this regard, as aging causes processor errors at the limits of the processor's original operating range, the operating range can be adjusted to prevent at least some of these errors in the future. Therefore, the processor is capable of adjusting its operating range to be more consistent with its current operating capabilities to help ensure a more robust system.

Figure 1:
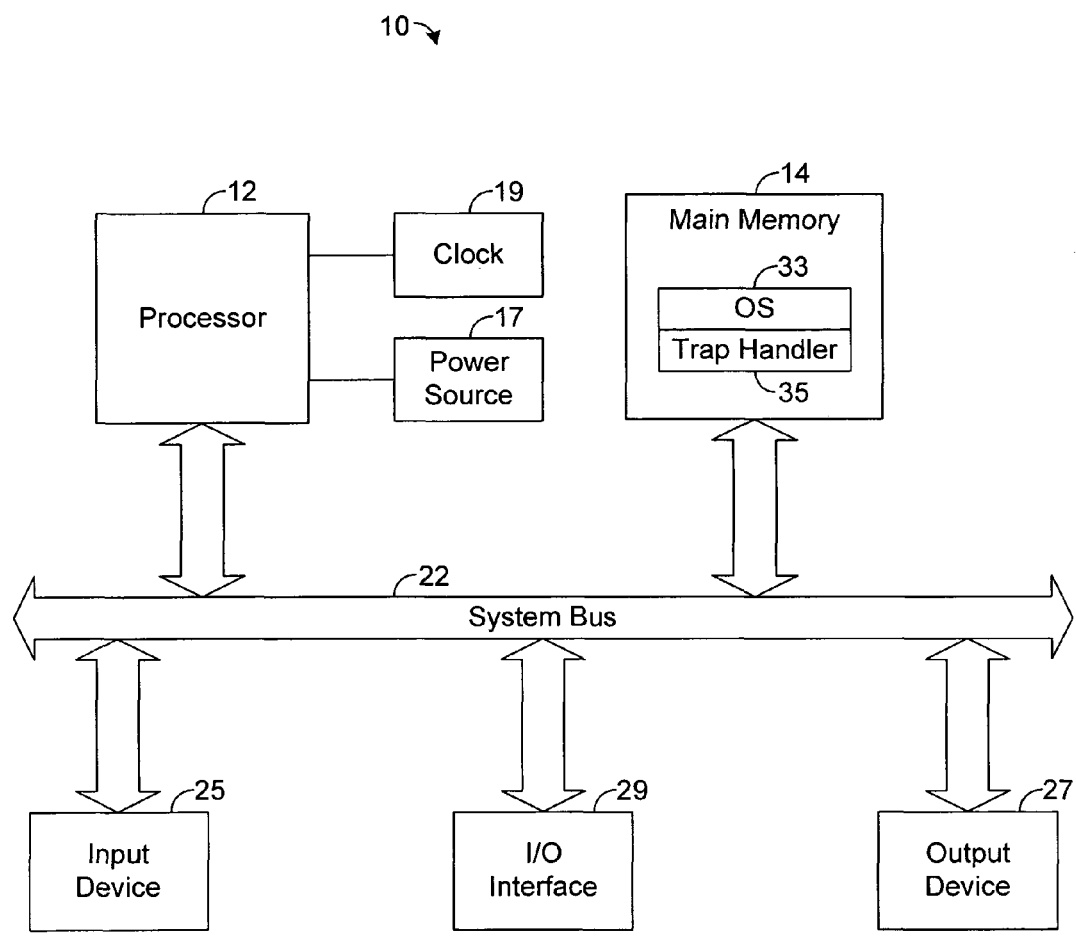
FIG. 1 is a block diagram illustrating a computer system in accordance with one exemplary embodiment of the present disclosure.

FIG. 1 depicts a computer system 10 in accordance with an exemplary embodiment of the present disclosure. As shown by FIG. 1, the system 10 comprises at least one processor 12 for executing instructions of computer code (not specifically shown) that may be stored in the system 10, such as in main memory 14. The processor 12 is coupled to and receives a power signal from a power source 17. Also, the processor 12 is coupled to and receives a clock signal from a clock 19. The power signal from the power source 17 and the clock signal from the clock 19 control the operating temperature and frequency of the processor 12.

The system 10 of FIG. 1 also comprises a system bus 22 over which the processor 12 communicates data with the main memory 14 and other system components, such as an input device 25, an output device 27, and an I/O interface 29. The input device 25, for example, a keyboard or a mouse, can be used to input data from a user of the system 10, and the output device 27, for example, a printer or monitor, can be used to output data to the user. The I/O interface 29 can comprise various known or future-developed interfaces (e.g., a universal serial bus (USB) port, a modulator/demodulator (modem), etc.) that enable communication with external devices.

In addition, the system 10 comprises an operating system 33 for controlling the resources of the system 10 in accordance with techniques similar to those implemented by conventional operating systems, such as Microsoft Windows®. The operating system 33 may be implemented in hardware, software, firmware, or any combination thereof. In one embodiment, the operating system 33 is implemented in firmware and stored in non-volatile memory, such as read-only memory (ROM).

The system 10 of FIG. 1 also comprises a trap handler 35, which may be implemented in hardware, software, firmware, or any combination thereof. The trap handler 35 is invoked by the operating system 33 upon the detection of specific events, referred to as "traps." For example, the trap handler 35 may be invoked upon detection of a processor error or other type of error, and the trap handler 35 may then handle the error such that its effects are eliminated or mitigated. An exemplary operation of the trap handler 35 will be described in more detail hereinbelow. In one embodiment, the trap handler 35 is implemented in firmware along with the operating system 33 and stored in non-volatile memory, such as ROM. However, other configurations of the trap handler 35 are possible.

Figure 2:
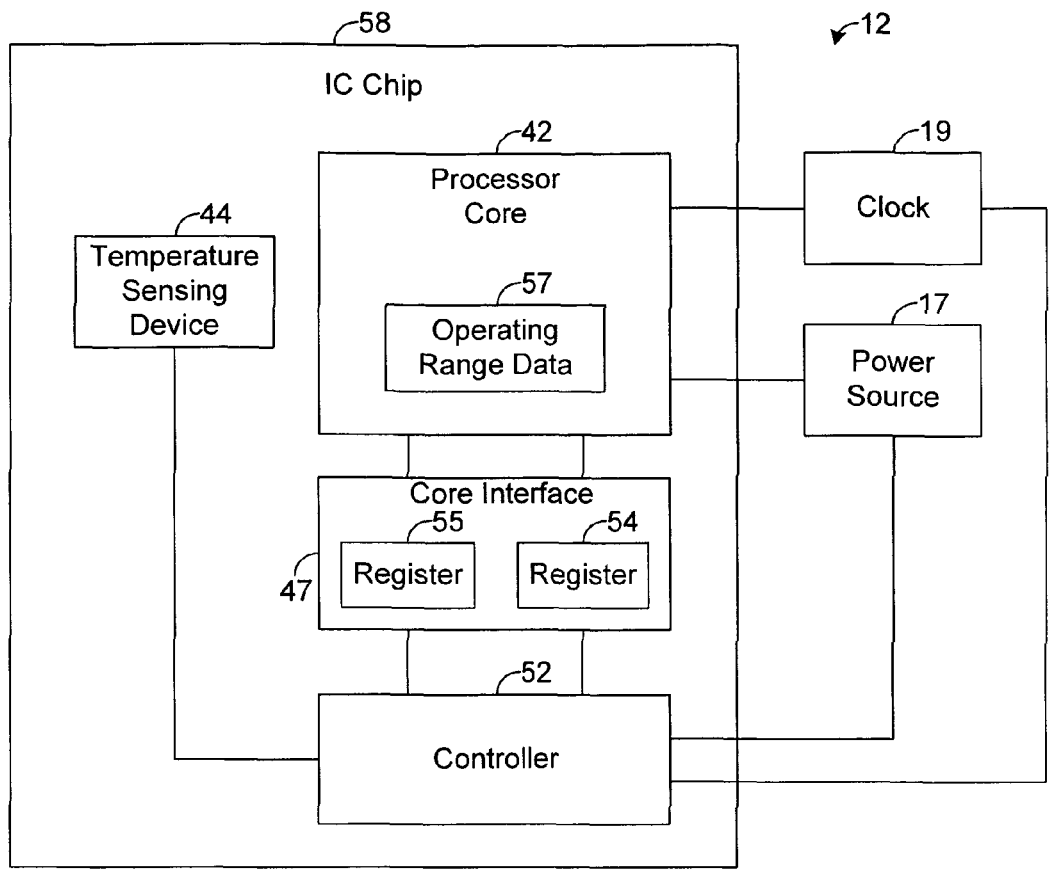
FIG. 2 is a block diagram illustrating an exemplary processor, such as is depicted in FIG. 1.

FIG. 2 depicts a more detailed view of the processor 12. As shown by FIG. 2, the processor 12 comprises a processor core 42 for executing instructions. The core 42 may include one or more pipelines (not specifically shown) that execute instructions in stages in accordance with many conventional processor cores. As shown by FIG. 2, the processor 12 comprises a temperature sensing device 44, which can be used to determine an approximate operating temperature of the processor core 42. In one embodiment, the temperature sensing device 44 is a diode, although other types of temperature sensing devices may be used in other embodiments.

The processor core 42 is electrically coupled to a core interface 47 that provides a communication interface between the processor core 42 and a controller 52. In this regard, the core interface 47 comprises a core output register 54 that buffers data transmitted from the processor core 42 and a core input register 55 that buffers data transmitted from the controller 52. The controller 52 can be implemented in hardware, software, firmware, or a combination thereof. In one embodiment, the controller 52 comprises a microprocessor that fits in the same IC package as the processor core 42 and core interface 47. However, other types of components may be used to implement the controller 52 in other embodiments.

Note that the operating system 33, trap handler 35, and controller 52, when implemented in software, can be stored and transported on any computer-readable medium for use by or in connection with an instruction execution system that can fetch and execute instructions. In the context of this document, a "computer-readable medium" can be any means that can contain, store, communicate, propagate, or transport a program for use by or in connection with an instruction execution system. The computer readable-medium can be, for example but not limited to, an electronic, magnetic, optical, electromagnetic, infrared, or semiconductor device or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

As shown by FIG. 2, the controller 52 is electrically coupled to the temperature sensing device 44, the power source 17, and the clock 19. By transmitting control signals to the power source 17 and the clock 19, the controller 52 is able to adjust the power signal and the clock signal provided to the processor core 42. During operation, the controller 52 detects the operating temperature of the processor core 42, based on the temperature sensing device 44, and adjusts the power and clock signal provided to the processor core 42 in order to keep the operating temperature and frequency of the core 42 within a desired range, such as the processor's original operating range specified by the processor's manufacturer.

In this regard, the processor's manufacturer may determine the processor's original operating range, based on testing performed by the manufacturer prior to shipment. Data 57 defining this operating range may be stored in non-volatile memory. In FIG. 2, the data 57, referred to as the "operating range data," is stored in memory (not specifically shown in FIG. 2) within the core 42. However, such data 57 may be stored in other locations, including locations external to the processor 12.

The data 57 preferably defines the range of operating points at which the processor core 42 is allowed to operate. This data 57 may be provided to the controller 52 at system boot or at another time period, and the controller 52 may be configured to control the power source 17 and clock 19 based on the data 57.

For example, the data 57 may define a maximum frequency (e.g., 2.8 Giga-Hertz) for the clock signal. Also, the data 57 may define a maximum temperature threshold at which the core 42 is allowed to operate, and the data 57 may define different temperature, voltage, and frequency thresholds for various operating points or conditions. For example, when the temperature of the core 42, as measured by the temperature sensing device 44, is within a certain range, the data 57 may specify an upper frequency threshold that is below the maximum frequency threshold described above. Moreover, the controller 52 may control the power signal and clock signal provided to the core 42 in an effort to prevent the thresholds indicated by the data 57 from being violated. As an example, assume that the data 57 defines an upper temperature threshold for a particular range of voltages and frequencies. If the temperature measured via the temperature sensing device 44 reaches or exceeds such an upper temperature threshold while the voltage of the power signal and the frequency of the clock signal are within the particular range, then the controller 52 may reduce the voltage of the power signal and/or the frequency of the clock signal in an effort to reduce the core's operating temperature. If, on the other hand, the operating temperature falls below a lower temperature threshold, the controller 52 may increase the voltage of the power signal and/or the frequency of the clock signal in an effort to increase the core's performance. U.S. Pat. No. 6,363,490, entitled "Method and Apparatus for Monitoring the Temperature of a Processor," and filed on Mar. 30, 1999, which is incorporated herein by reference, describes exemplary techniques that may be used to control the operating temperature and frequency of the core 42 based on a sensed temperature of the core 42. Further, it is possible for the processor 12 to have additional cores (not shown) to increase the performance of the processor 12.

As shown by FIG. 2, the processor core 42, core interface 47, and controller 52 are preferably packaged together and integrated on a single IC chip 58. The power source 17 and clock 19 may be coupled to I/O pins (not shown) of the IC chip 58, and may reside on the same printed circuit board (PCB) as the IC chip 58. However, in other embodiments, the power source 17 and clock 19 may reside on one more separate PCBs that are interfaced with the PCB of the IC chip 58.

Figure 3:
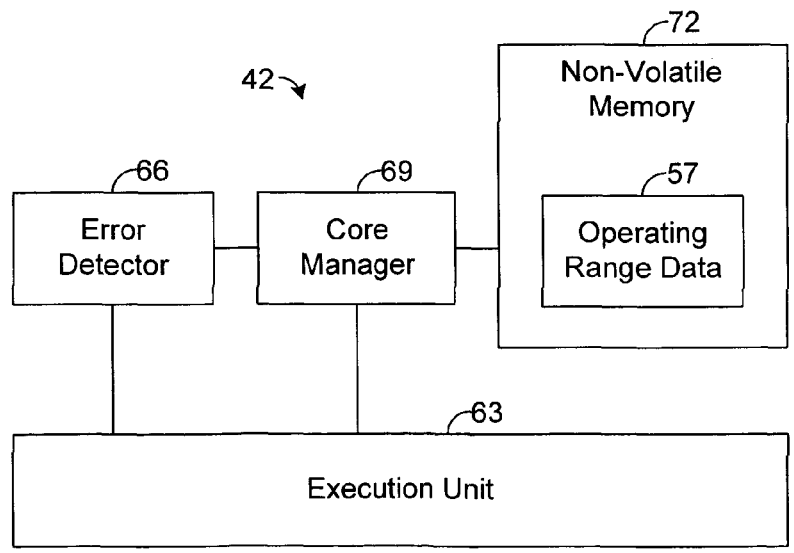
FIG. 3 is a block diagram illustrating an exemplary processor core, such as is depicted in FIG. 2.

FIG. 3 depicts a more detailed view of the processor core 42. As shown by FIG. 3, the processor core 42 comprises an execution unit 63, an error detector 66, a core manager 69, and non-volatile memory 72. The execution unit 63 comprises circuitry (not specifically shown), such as one or more pipelines, for executing instructions. The error detector 66 and core manager 69 may be implemented in hardware, software, firmware, or any combination thereof. For example, in one exemplary embodiment, the error detector 66 and the core manager 69 are implemented in hardware via logic gates. In other embodiments, any portion of the error detector 66 and the core manager 69 may be implemented in software or firmware and stored within the core's memory, such as non-volatile memory 72. However, it is possible for at least portions of the error detector 66 and core manager 69 to be located off-chip and, therefore, external to processor 12. The error detector 66 and the core manager, when implemented in software, can be stored and transported on any computer-readable medium for use by or in connection with an instruction execution system.

As shown by FIG. 3, the operating range data 57 can be stored in memory 72. At system boot or other time period, the data 57 may be transmitted to the controller 52 via the core interface 47 (FIG. 2) and used by the controller 52 to control the power signal and clock signal provided to the processor core 42 by the power source 17 and the clock 19, respectively. However, as the processor 12 ages, processor errors may become more frequent, particularly at operating points close to the limits of the operating range defined by the data 57. The core manager 69 is configured to determine whether a more suitable operating range is desirable based on processor errors detected by the error detector 66 and to then update the operating range data 57 if the core manager 69 determines that a new operating range is more preferable relative to the current operating range. The updated data 57 is communicated to the controller 52, which then attempts to ensure that the operating points of the processor core 42 remain within the new operating range defined by the updated data 57.

For example, assume that the original operating range of the processor core 42 allows frequencies up to 2.4 Giga-Hertz (GHz). However, due to age degradation after several years of operation, processor errors may begin occurring frequently above 2.2 GHz. Based on one or more such errors, the core manager 69 may be configured to adjust the operating range data 57 such that the maximum frequency is reduced from 2.4 GHz to a lower frequency, such as, for example, 2.2 GHz. Thus, the controller 52, based on the updated data 57, may prevent the core 42 from operating above 2.2 GHz thereby preventing at least some processor errors attributable to the core 42 operating between the range of 2.2 GHz and 2.4 GHz.

Further, upon detection of a processor error resulting from an operation performed by the execution unit 63, the core manager 69 may instruct the controller 52 to change the operating point of the core 42. In response, the controller 52 adjusts the power signal and/or the clock signal provided by the power source 17 and the clock 19 such that the core 42 operates at a new operating point. Once the core 42 is operating at the new operating point, the core manager 69 causes the execution unit 63 to retry the operation that previously resulted in the detected error. If the error was caused, at least in part, to the operating point of the core 42, then it is possible that retrying the operation at the new operating point will allow the operation to complete without error. Thus, it is possible for the operation to be completed and for the core 42 to continue operation such that the effect of the error is effectively transparent to the user of the system 10 thereby increasing the robustness of the processor 12 and the system 10.

Various techniques may be employed to enable adjustment of the core's operating range and handling of errors as described above. For purposes of illustration, exemplary techniques for achieving the foregoing will be described in more detail hereafter. However, it should be emphasized that variations to these exemplary techniques are possible and indeed would be apparent to one of ordinary skill in the art upon reading this disclosure.

Initially, for example, at system boot, the core manager 69 retrieves the operating range data 57 from memory 72 and transmits this data 57 to the core interface 47, which buffers the data 57 in register 54. The controller 52 reads the data 57 from buffer 54 and, based on this data 57, begins controlling the power source 17 and the clock 19 such that the core 42 operates only within the operating range specified by the data 57.

While operating within the operating range specified by the data 57, the execution unit 63 executes instructions from code stored in the system 10, such as in main memory 14. In executing the instructions, the execution unit 63 performs various operations, as indicated by block 112 of FIG. 4. The error detector 66 monitors the operations of the execution unit 63 in an effort to identify any detectable processor errors, as indicated by block 115 of FIG. 4. If the error detector 66 detects a processor error for a particular operation, the detector 66 notifies the core manager 69 of the detected error. In response, the core manager 69 interrupts the operation of the execution unit 63 and submits a function call to the operating system 33 (FIG. 1).

The function call indicates that a processor error has been detected and provides information about the type of error detected. Based on the function call, the operating system 33 invokes the trap handler 35 to handle the detected processor error. In handling the processor error, the trap handler 35 communicates with the core manager 69 and, in particular, instructs the core manager 69 to change the operating point of the core 42 and to retry the operation that induced the detected processor error. In response, the core manager 69 transmits a request, referred to hereafter as the "operating point change request," to the core interface 47. The operating point change request is essentially an instruction to the controller 52 to change the operating point of the core 42 and includes information indicative of the new operating point at which the core 42 is to be set. For example, the operating point change request may specify a new voltage, frequency, and/or temperature for the processor core 42.

The core interface 47 buffers the operating point change request in register 54, which is eventually read by the controller 52. In response to the operating point change request, the controller 52 changes the operating point of the core 42, as indicated by block 118 of FIG. 4. In particular, the controller 52 transmits control signals to the power source 17 and/or the clock 19 to change the power signal and/or clock signal provided to the core 42. For example, if the operating point change request specifies a new voltage that is lower than the current voltage of the power signal provided to the core 42, then the controller 52 transmits a control signal to the power source 17 causing it to reduce the voltage of the power signal provided to the core 42. If the operating point change request specifies a new frequency that is lower than the current frequency of the clock signal provided to the core 42, then the controller 52 transmits a control signal to the clock 19 causing it to reduce the frequency of the clock signal provided to the core 42. If the operating point change request specifies a new temperature that is below the current temperature of the core 42, the controller 52 may transmit a control signal to either the power source 17 or the clock 19 causing the power source 17 or the clock 19 to reduce the voltage or frequency of the power signal or clock signal provided to the core 42 thereby reducing the temperature of the core 42.

Once the controller 52 has set the operating point of the core 42 as instructed by the operating point change request, the controller 52 transmits a notification to the core interface 47 indicating that the operating point of the core 42 has been changed as requested. The core interface 47 buffers the notification in the register 55, which is eventually read by the core manager 69. Upon reading the notification, the core manager 69 instructs the execution unit 63 to retry the operation that caused the detected processor error. In response, the execution unit 63 retires the operation as indicated by block 121 of FIG. 4.

Figure 4:
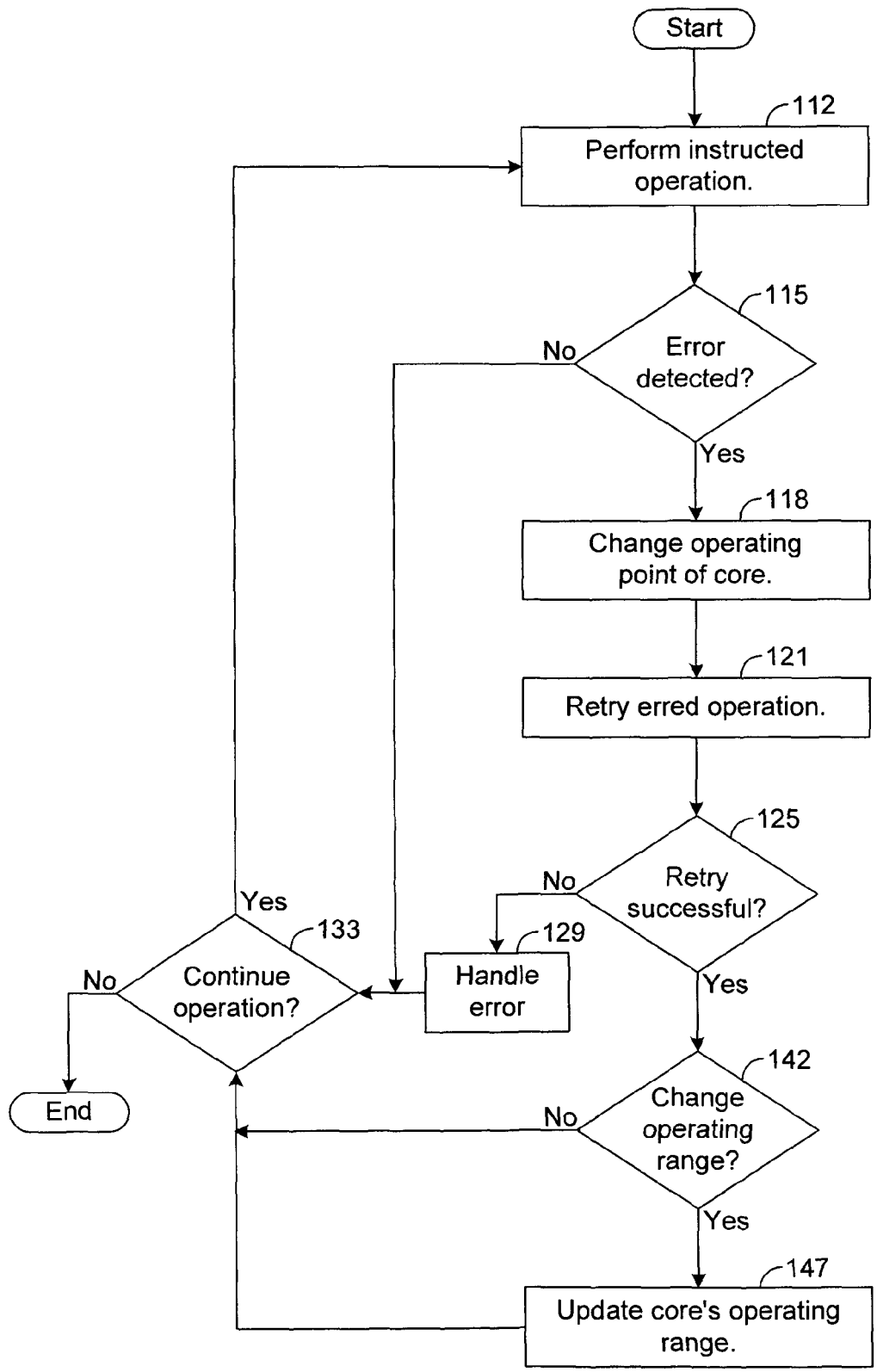
FIG. 4 is a flow chart illustrating an exemplary process for adjusting operating points of a processor, such as is depicted in FIG. 2, based on detected processor errors.

During the retried operation, the error detector 66 monitors the execution unit 63 to determine whether the retry results in a processor error, as indicated by block 125 of FIG. 4. If the retry is unsuccessful (i.e., results in a processor error), then the error detector 66 notifies the core manager 69 of the newly detected error. In response, the core manager 69 notifies the trap handler 35 of the error, and the trap handler 35 handles the newly detected error in block 129 of FIG. 4. For example, since the erred operation has been unsuccessfully retried at a different operating point, the trap handler 35 may assume that the error from the retried operation is not attributable to the operating point of the processor core 42 and may handle the error in some manner similar to conventional trap handlers. For example, the trap handler 35 may terminate operation of the core 42 or execution of the code that caused the core 42 to perform the erred operation. Alternatively, the trap handler 35 may take additional steps to try to resolve the error. Various other actions by the trap handler 35 are also possible.

In any event, after handling of the processor error in block 129, the core manager 69 determines whether the core 42 is to continue operation, as indicated by block 133. For example, a request to terminate operation of the core 42 may be received from a user (e.g., when the user submits a command to shut down the system 10) or may be received from the trap handler 35 if the trap handler 35 determines in block 129 that the operation of the core 42 is to be terminated. If operation of the core 42 is to continue, then the core manager 69 allows the execution unit 63 to perform the next operation in block 112.

However, if the operation being retried in block 121 does not result in a processor error, then the core manager 69 notifies the trap handler 35 of the successful completion of the retried operation. In response, the trap handler 35 determines whether the core's operating range, as indicated by the operating range data 57, should be changed. In this regard, since the erred operation has been successfully retried at a different operating point, the trap handler 35 may assume that the previously detected error from this operation was attributable to the operating point of the processor core 42 at the time of the error. Thus, the trap handler 35 may determine, in block 142 of FIG. 4, that the operating range should be updated to prevent the core 42 from operating at such an operating point. The decision to adjust the operating range of the core 42 may be based on a single occurrence of a processor error, or may be based on multiple occurrences over time.

For example, the trap handler 35 may be configured to track and log each processor error that it handles. A record of such errors may be stored in non-volatile memory so that the record can be maintained over the life of the system 10. In block 142, the trap handler 35 may be configured to analyze the record and, based on this analysis, make a determination as to whether the core's operating range should be adjusted.

As an example, if processor errors are frequent at a particular operating point or range of points, referred to hereafter as the "erred operating range," then the trap handler 35 may determine that the core's operating range is to be adjusted so that the core 42 does not operate at the particular point or range of points. In other words, the core's operating range may be adjusted such that it excludes the erred operating range. Alternatively, the erred operating range may be identified based upon a single error rather than a record of errors over time. For example, if the retried operation performed in block 121 is successful, then the erred operating range can be determined to include the operating point at which the core was operating at the time of the error detected in block 115 as well as a range of operating points close to this operating point. Various techniques for identifying the erred operating range to be excluded from the core's allowable operating range are possible.

If the trap handler 35 determines that the core's operating range is to be adjusted in block 142 of FIG. 4, then the trap handler 35 transmits, to the core manager 69, an instruction for changing the core's operating range, and the instruction preferably indicates the manner in which the core's operating range is to be changed. In response, the core manager 69 updates the core's operating range according to the foregoing instruction, as indicated by block 147 of FIG. 4. In this regard, the core manager 69 updates the operating range data 57 in memory 72 (FIG. 3) as requested so that the change to the core's operating range will be effective for future power cycles. Further, the core manager 69 also notifies the controller 52 via the core interface 47 of the change so that the controller 52 can begin enforcing the change before the next power cycle. Thus, the controller 52, for future operations, ensures that the operating point of the core 42 does not reach the operating point or range of operating points excluded from the core's updated operating range. Therefore, future processor errors that would have been attributed to the core 42 operating within the excluded range are prevented.

If the core manager 69 is instructed by the trap handler to update the core's operating range, then the core manager 69 preferably notifies the trap handler 35 once this update is complete. Upon receiving this notification or upon making a "no" determination in block 142, the trap handler 35 notifies the operating system 33 that the handling of the detected processor error is complete. Thus, the operating system 33 instructs the core manager 69 to continue normal operation. In block 133, the core manager 69 determines whether operation of the core 42 is to continue. If so, the core manager 66 allows the execution unit 63 to perform the next operation in block 112. If not (e.g., if a request to shut down the system 10 is received from the user), the core manager 66 terminates operation of the execution unit 63 and core 42, as appropriate, and the process depicted by FIG. 4 ends.

Moreover, by implementing the process depicted by FIG. 4, processor errors attributable to the operating point of the processor core 42 can be successfully handled such that a processor operation resulting in an error can be successfully retried at a different operating point and completed. Further, based on a detected error and whether an erred operation successfully completes while the core 42 is at a different operating point, the operating range of the core 42 can be dynamically adjusted such that future errors are prevented. Accordingly, the system 10 and, in particular, the processor 12 is capable of operating more robustly, particularly as the system 10 ages and processor errors attributable to age degradation become more frequent.

The invention claimed is:

1. A processor, comprising:
a processor core having an execution unit configured to execute instructions and to attempt to perform at least one operation in executing one of the instructions, the processor core configured to detect a processor error associated with the at least one operation, receive power supplied by a power signal from a power source, and receive a clock signal from a clock;
memory configured to store data indicative of an allowable operating range of operating points for the processor core; and
a controller configured to control the power source to control an amount of power supplied by the power signal and control the clock to control a frequency of the clock signal provided to the processor core based on the data to maintain the allowable operating range and configured to control the power source to reduce the amount of power supplied by the power signal and control the clock to reduce the frequency of the clock signal provided to the processor core to thereby change an operating point of the processor core in response to a detection of the processor error such that the processor core operates at a new operating point,
wherein the processor core is configured to retry the at least one operation while the processor core is operating at the new operating point,
wherein the processor is configured to update the data based on detection of one or more processor errors.

2. The processor of claim 1, further comprising a chip, wherein the processor core and the controller are integrated on the chip.

3. The processor of claim 1, further comprising a temperature sensing device, wherein the controller is configured to determine temperatures of the processor core based on the temperature sensing device and to control the power source to control the amount of power supplied by the power signal and the clock to control the frequency of the clock signal provided to the processor core based on the sensed temperatures.

4. The processor of claim 3, further comprising a chip, wherein the processor core, the controller, and the temperature sensing device are integrated on the chip.

5. The processor of claim 1, wherein the processor core is configured to retry the at least one operation after ensuring that the operating point of the processor core has been changed to the new operating point.

6. The processor of claim 1, wherein the controller is configured to prevent, based on the detection of the processor error, the processor core from operating at an operating point of the processor core at the time of the detection.

7. The processor of claim 1, wherein the processor is configured to update the data based on a determination as to whether the processor error is attributable to an operating point of the processor core at the time of the processor error.

8. The processor of claim 1, further comprising a chip, wherein the processor core, the controller, and the memory are integrated on the chip.

9. The processor of claim 1, wherein the controller is configured to control the clock to control the frequency of the clock signal and the power source to control the amount of power supplied by the power signal provided to the processor core based on the updated data to maintain an updated allowable operating range.

10. A computer system, comprising:
a processor core having an execution unit configured to execute instructions and to attempt to perform at least one operation in executing one of the instructions, the processor core configured to detect a processor error associated with the at least one operation, receive power supplied by a power signal from a power source, and receive a clock signal from a clock;
memory for storing data indicative of an allowable operating range of operating points for the processor core;
means for controlling the clock to control a frequency of the clock signal and the power source to control an amount of power supplied by the power signal provided to the processor core based on the data to maintain the allowable operating range and for controlling the clock to reduce the frequency of the clock signal and the power source to reduce the amount of power supplied by the power signal provided to the processor core to thereby transition the processor core to a new operating point in response to a detection of the processor error; and
means for causing the processor core to retry the at least one operation once the processor core has been transitioned to the new operating point, wherein the processor is configured to update the data based on detection of one or more processor errors.

11. The system of claim 10, wherein the causing means further comprises:
means for updating the data based on whether the at least one operation is successfully retried by the processor core such that the data indicates a new allowable operating range of operating points for the processor core.

12. A method for use in a processor-based system, comprising:
executing instructions via a processor core, the executing comprising attempting to perform at least one operation while the processor core is operating at a first operating point;
receiving, at the processor core, power supplied by a power signal from a power source;
receiving, at the processor core, a clock signal from a clock;
storing data indicative of an allowable operating range of operating points for the processor core;
controlling the clock to control a frequency of the clock signal and the power source to control an amount of power supplied by the power signal provided to the processor core based on the data to maintain the allowable operating range;
detecting a processor error resulting from the attempting to perform the at least one operation;
controlling the clock to reduce the frequency of the clock signal and the power source to reduce the amount of power supplied by the power signal provided to the processor core to thereby transition the processor core to a second operating point in response to the detecting;
causing the processor core to retry the at least one operation while the processor core is operating at the second operating point; and
updating the data based on detecting one or more processor errors.

13. The method of claim 12, further comprising:
determining temperatures of the processor core based on a temperature sensing device; and
controlling the clock signal and the power signal based on the sensed temperatures.

14. The method of claim 12, further comprising preventing the processor core from operating at the first operating point based on the detecting.

15. The method of claim 12, further comprising:
determining whether the processor error is attributable to the first operating point; and
updating the data based on the determining.

* * * * *